(12) United States Patent
Adam

(10) Patent No.: US 10,040,007 B2
(45) Date of Patent: Aug. 7, 2018

(54) FILTRATION SYSTEM FOR FILTRATION OF SOLIDS FROM A LIQUID

(71) Applicant: EMPIRE TECHNOLOGY DEVELOPMENT LLC, Wilmington, DE (US)

(72) Inventor: Quentin Arthur Carl Adam, Lane Cove (AU)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 281 days.

(21) Appl. No.: 14/648,460

(22) PCT Filed: Oct. 25, 2013

(86) PCT No.: PCT/US2013/066836
§ 371 (c)(1),
(2) Date: May 29, 2015

(87) PCT Pub. No.: WO2014/084997
PCT Pub. Date: Jun. 5, 2014

(65) Prior Publication Data
US 2015/0306525 A1    Oct. 29, 2015

(51) Int. Cl.
*B01D 29/62* (2006.01)
*B01D 29/00* (2006.01)
(Continued)

(52) U.S. Cl.
CPC ......... *B01D 29/62* (2013.01); *B01D 29/0075* (2013.01); *B01D 29/0086* (2013.01);
(Continued)

(58) Field of Classification Search
CPC ............ B01D 29/0075; B01D 29/0086; B01D 29/62; B01D 29/66; B01D 29/72;
(Continued)

(56) References Cited

U.S. PATENT DOCUMENTS 4,158,629 A    6/1979 Sawyer
4,645,542 A    2/1987 Scharton et al.
(Continued)

FOREIGN PATENT DOCUMENTS

WO    WO 01/047399 A2    7/2001

OTHER PUBLICATIONS

Robinson et al., The dymanics of spherical bubble growth, *International Journal of Heat and Mass Transfer* (Aug. 18, 2004), 47:5101-5113.
(Continued)

*Primary Examiner* — Matthew O Savage

(57) ABSTRACT

Filtration systems and methods for removing a filter residue from a filter employed in filtering a liquid (for example, grey water). The filtration system may include a vessel having an inlet through which a liquid can be introduced during use and an outlet through which filtered clean liquid can exit. A filter configured to filter the liquid is disposed within the vessel between the inlet and the outlet. The filtration system may further include at least one transducer disposed on or adjacent to the filter. The at least one transducer may be configured to generate one or more pressure waves effective to dislodge at least some residue materials collected on an upstream side of the filter.

9 Claims, 13 Drawing Sheets

(51) Int. Cl.
- *B01D 29/72* (2006.01)
- *B01D 65/02* (2006.01)
- *B01D 65/08* (2006.01)
- *B01D 29/50* (2006.01)
- *B01D 29/66* (2006.01)
- *B01D 63/02* (2006.01)
- *C02F 1/34* (2006.01)
- *C02F 1/44* (2006.01)
- *C02F 103/00* (2006.01)

(52) U.S. Cl.
CPC ............ *B01D 29/50* (2013.01); *B01D 29/66* (2013.01); *B01D 29/72* (2013.01); *B01D 63/02* (2013.01); *B01D 65/02* (2013.01); *B01D 65/08* (2013.01); *B01D 2321/2033* (2013.01); *B01D 2321/2066* (2013.01); *B01D 2321/2075* (2013.01); *B01D 2321/22* (2013.01); *C02F 1/34* (2013.01); *C02F 1/44* (2013.01); *C02F 2103/002* (2013.01); *C02F 2303/16* (2013.01)

(58) Field of Classification Search
CPC ................ B01D 65/02; B01D 65/08; B01D 2321/2075; B01D 63/02; B01D 29/50; B01D 2321/2033; B01D 2321/2066; B01D 2321/22; C02F 1/44; C02F 2103/002; C02F 1/34; C02F 2303/16
See application file for complete search history.

(56) References Cited

U.S. PATENT DOCUMENTS

| | | | |
|---|---|---|---|
| 6,221,255 B1 * | 4/2001 | Vadoothker | ............ B01D 29/01 210/103 |
| 7,347,937 B1 | 3/2008 | Cheng et al. | |

OTHER PUBLICATIONS

International Search Report and Written Opinion for International Application No. PCT/US2012/065927 dated May 21, 2013.

* cited by examiner

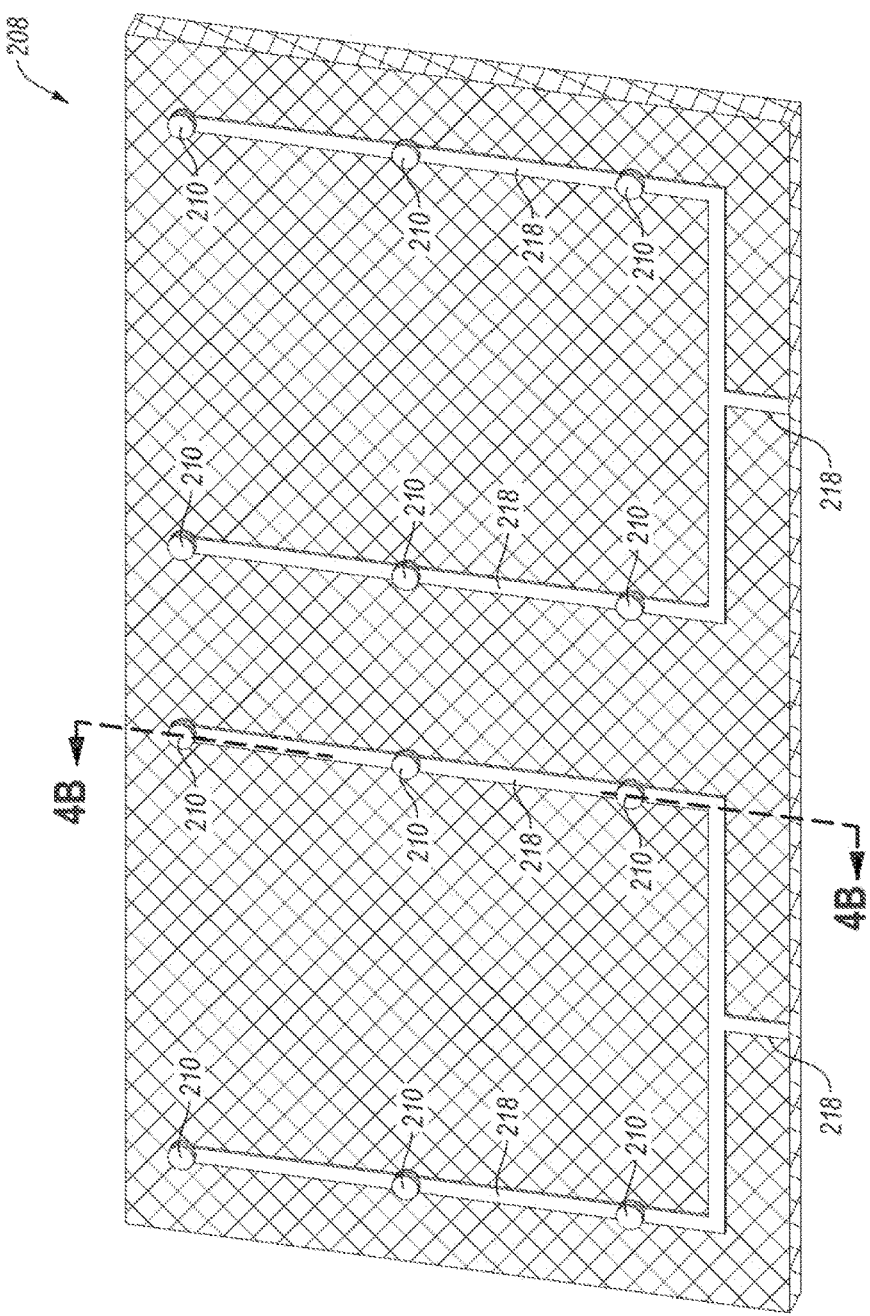
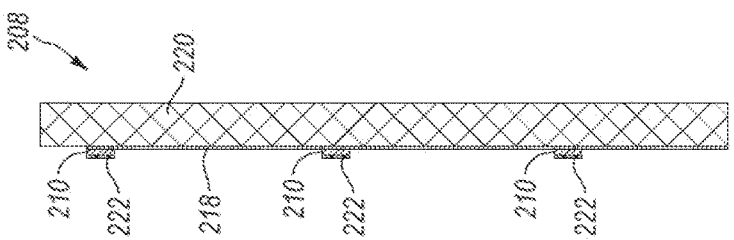
FIG. 4A
FIG. 4B

FILTRATION SYSTEM FOR FILTRATION OF SOLIDS FROM A LIQUID

CROSS-REFERENCE TO RELATED APPLICATIONS

This Patent Application is a U.S. National Stage filing under 35 U.S.C. § 371 of International Application No. PCT/US2013/066836, entitled "FILTRATION SYSTEMS AND METHODS FOR FILTERING SOLIDS", filed on Oct. 25, 2013, that claims the benefit of Australian Provisional Application No. 2012905265, filed on Nov. 30, 2012, the entire contents of which are incorporated herein by reference in their entirety.

BACKGROUND

Wastewater treatment and other water treatment schemes are useful for providing treated water for numerous uses, particularly in locations where access to sufficient fresh water (sometimes referred to as "white water") is limited. There are several treatment methods in use, ranging from primary settling treatment through secondary and tertiary treatment regimes, each using various degrees of physical sedimentation and floatation, biological treatment, filtration, chlorination, ozonation, and so on.

There are several types of filtration systems in use, depending on the type and quality of both the water being treated and the desired end use of that water. With particular regard to commercial scale filtration systems, examples include hollow fiber filters with pore sizes in the micrometer and nanometer range. Smaller pore sizes are found in reverse osmosis systems which may be used for example to desalinate sea water for human consumption.

Given the way in which filters work, that is to provide a barrier to undesired material in the water, they eventually build up residue on their upstream surface. This residue can reduce the performance of the filter and therefore must regularly be cleaned. Cleaning regimes may include liquid or gas backwashing, gas scouring, or chemical treatment.

SUMMARY

Embodiments of the present disclosure are directed to filtration systems, filter modules, and methods for removing residue (for example, a filter cake) from a filter used in filtering a liquid (for example, grey water, black water, municipal water, river water, sea water, another liquid, etc.). Such embodiments allow materials such as solids or other residues that can become caked against an upstream surface of a filter of such a filtration system to be at least in part removed.

An embodiment is directed to a filtration system for filtering a liquid. The filtration system may include a vessel having an inlet through which a liquid can be introduced during use and an outlet through which filtered, cleaned liquid can exit. A filter that is configured to filter residue from such a liquid may be disposed within the vessel between the inlet and outlet. The filtration system may further include at least one transducer disposed in, on or adjacent to the filter. The at least one transducer may be configured to generate one or more pressure waves effective to dislodge residue collected on an upstream side of the filter. The at least one transducer may employ an electrical power input to produce an energy output in a different form (for example, heat energy, mechanical movement, audio energy, light or other electromagnetic energy, a spark, etc.) that results in generation of a pressure wave within the liquid.

An embodiment is directed to a filter module for use in a filtration system for filtering solids from a liquid. The filter module includes a plurality of hollow fiber membrane filters. Each hollow fiber membrane filter may be configured to filter a liquid. The filter module includes at least one transducer disposed in, on, or adjacent to the plurality of hollow fiber membrane filters. The at least one transducer may be configured to generate one or more pressure waves effective to dislodge at least some residue from the plurality of hollow fiber filters.

Another embodiment is directed to a method for removing at least some residue from a filter used in filtering a liquid. The method includes generating at least one pressure wave within a liquid at a location in, on, or adjacent to a filter having a residue disposed thereon. Generation of the pressure wave dislodges at least some of the residue from the filter, which would otherwise reduce performance of the filter. Once dislodged, the dislodged residue may be removed.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 4A is a perspective view of an embodiment of a filter including a plurality of transducers disposed thereon, with one or more electrically conductive traces disposed on the filter to provide electrical power to the transducers.

FIG. 4B is a cross-sectional view through the filter of FIG. 4A.

DETAILED DESCRIPTION

Figure 1A:
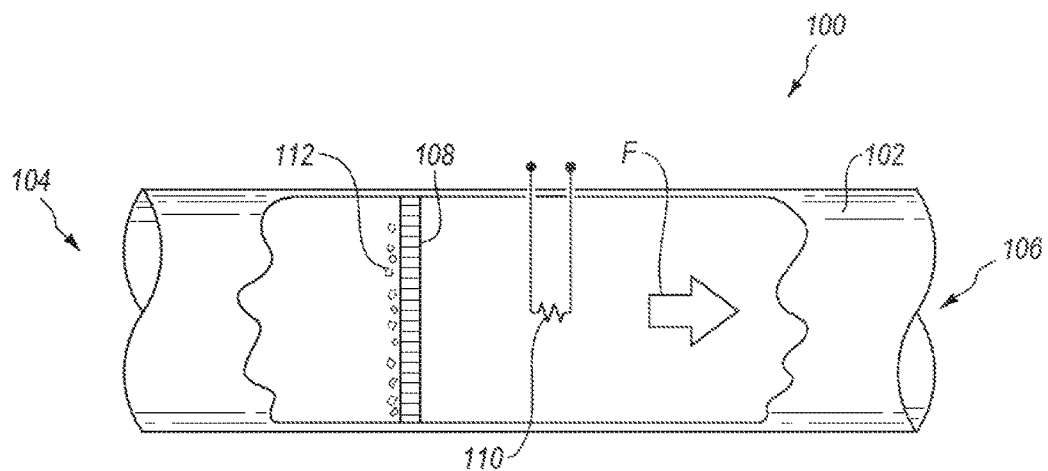
FIG. 1A is a cut-away perspective view of an embodiment of a filtration system including a vessel having a filter disposed therein with at least one transducer disposed adjacent to the filter that is configured to generate a pressure wave to dislodge at least some residue from the upstream side of the filter.

Embodiments of the present disclosure are directed to filtration systems, filter modules, and methods for removing residue from a filter used in filtering a liquid. Such embodiments may provide a convenient, simple, and inexpensive mechanism for removing accumulated filtered residue material from the upstream side of a filter of a filtration system. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIGS. 1A-1D illustrate an embodiment of a filtration system 100 including vessel 102 (for example, a cylindrical pipe) having inlet 104 and outlet 106. While system 100 may be shown with a single inlet 104 and single outlet 106, it will be understood that any of the various filtration systems within the scope of the present disclosure may include one or more than one inlets and one or more outlets at any suitable location on the vessel 102. A liquid (for example, grey water) can be introduced through inlet 104 and a filtered, clean liquid can exit through outlet 106. Filtration system 100 may include a filter 108 disposable within vessel 102 between inlet 104 and outlet 106. Filter 108 is configured to filter solids from a liquid (for example, grey water, black water, river water, mains water, a liquid other than water, etc.) introduced through inlet 104. Filtration system 100 may further include at least one transducer 110 disposed in, on or adjacent to filter 108. In FIG. 1A, transducer 110 is illustrated as being disposed downstream relative to filter 108, although other placement is possible, some of which are described below. Transducer 110 is capable of generating one or more pressure waves that are effective to dislodge at least some of residue 112 disposed on an upstream side of filter 108. In an embodiment, residue 112 may comprise various solids or other residue materials that are stopped by filter 108, which residue materials may form what may be referred to as a fouling layer. Such residue materials may include, but are not limited to, solid particulate materials, dissolved salts (for example, which may precipitate as solids), bacteria, or other materials within the grey liquid that may be denied passage through filter 108.

Filter 108 may comprise any suitable material or construction. In one embodiment, filter 108 may be a reverse osmosis filter. Filter 108 may be configured as a flexible, mesh membrane substrate, and may be formed of a material such as, but not limited to cellulose acetate, polysulfone, polyamide, polyolefins, and combinations thereof. Other materials (for example, paper, natural or synthetic fibers, metallic fiber or web, etc.) may also be employed. It will be readily apparent that any suitable filter material capable of filtering undesirable materials from a liquid may be employed. A reverse osmosis filter may be semi-permeable so as to allow passage of water or other liquid through filter 108, while preventing passage of other materials. A pressure may be applied to the feed side of the filtration system to provide a pressure gradient that causes water or other liquid to flow through the filter.

Transducer 110 may be any structure capable of converting an electrical energy (for example, an applied voltage) or other energy input to another output form (for example, heat energy, mechanical movement, audio energy, for example in the form of ultrasound waves, light, for example laser light or other electromagnetic energy, a spark, etc.) that results in generation of a pressure wave. Examples of transducers include, but are not limited to, a resistive heating element, a high frequency ultrasound generator (for example, a piezoelectric transducer), a laser, a sparking gap for generating a spark which heats the liquid to induce a phase change from liquid to vapor, or any other structure capable of converting an electrical or other power input to another form of energy that results directly or indirectly in generation of a pressure wave within the liquid (for example, grey water) within vessel 102.

For example, a resistive heating element, a laser, or a sparking gap may act to heat liquid immediately adjacent to and in contact with the transducer so as to induce a phase change from liquid to gas. The nearly instantaneous phase change results in a substantial increase in volume, generating a pressure wave. A high frequency ultrasound (for example, about 20,000 Hz or higher) generator may include a piezoelectric generator that can result in cavitation of the liquid (for example, as a result of a substantial drop in pressure), which similarly results in generation of a pressure wave within the liquid. Transducers operating under various other principles so as to result in generation of a pressure wave may also be employed.

Where transducer 110 acts to heat liquid immediately adjacent to transducer 110 so as to induce a phase change, the flow rate through system 100 may be reduced immediately prior to activation of transducer 110. Such slowing of the flow serves to reduce the pressure of the liquid, which reduces the input power requirements needed to achieve vaporization of the liquid at a given pressure. In addition, a pressure drop typically occurs as a result of passage through a filter such as filter 108 so that placement of transducer 110 downstream from filter 108 also reduces the pressure of the liquid and, thus, the power required to effect vaporization and pressure wave generation. Thus, in an embodiment, transducer 110 may be disposed downstream from filter 108, and/or the flow rate of liquid through filter 108 may be reduced so as to reduce the pressure and input power that would otherwise be required to achieve vaporization and pressure wave generation.

Figure 1B:
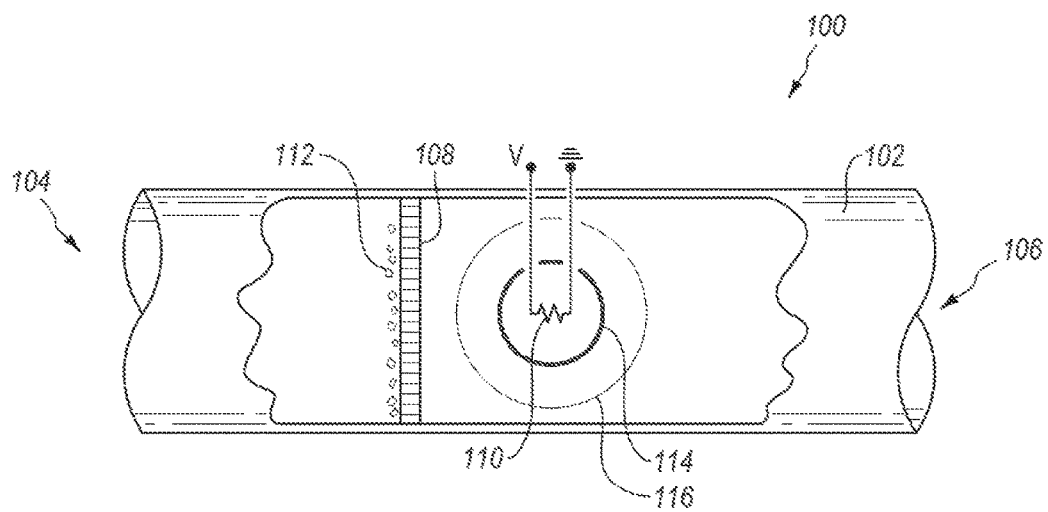
FIG. 1B is a cut-away perspective view of the filtration system of FIG. 1A, illustrating generation of a vapor bubble and resulting pressure wave.
Figure 1C:
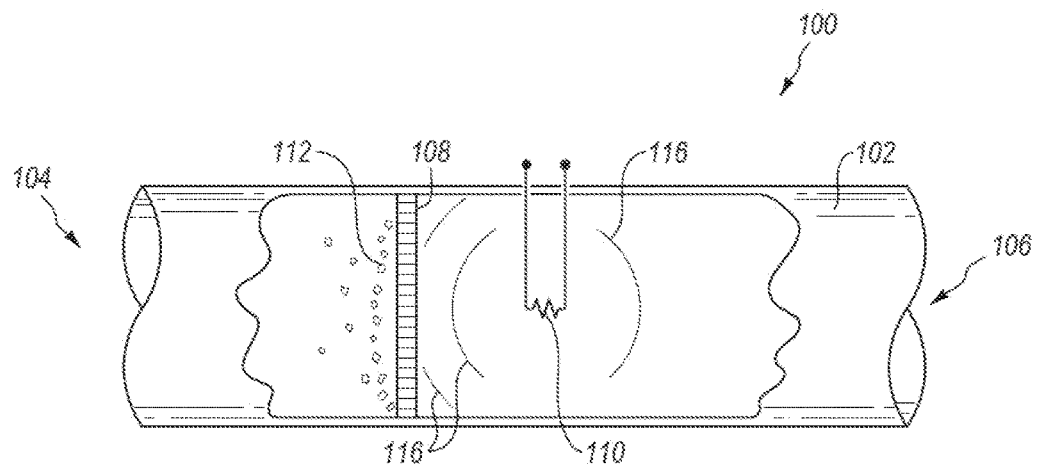
FIG. 1C is a cut-away perspective view of the filtration system of FIG. 1B illustrating dislodgement of residue from the upstream side of the filter as a result of action of the generated pressure wave.

In the embodiment illustrated in FIGS. 1A-1D, transducer 110 is disposed near filter 108, at a location that is downstream relative to filter 108. As shown in FIG. 1B, upon activation of transducer 110 (for example, a vapor bubble generating resistive heating element), a vapor bubble 114 forms within the liquid at transducer 110. Bubble 114 may form as a result of heating of the liquid adjacent to transducer 110. Because the heated portion of liquid expands rapidly upon vaporization, a vapor bubble 114 forms, generating a pressure wave 116 within the liquid. Pressure wave 116 results because vapor bubble 114 occupies a substantially larger volume than the same material before it was vaporized, when it was in a liquid state. As seen in FIG. 1C the vapor bubble may quickly collapse as the material of vapor bubble 114 quickly recondenses, while pressure wave 116 propagates outward from its point of origin. Pressure wave 116 hits the downstream side of filter 108, applying a force to residue 112 (for example, caked solids forming a fouling layer) that causes at least some of residue 112 to be dislodged from the upstream side of filter 108. For example, as shown in FIG. 1C, at least a portion of pressure wave 116 may propagate in an upstream direction, dislodging material 112 from an upstream side of filter 108 as pressure wave 116 passes through or otherwise contacts filter 108.

In the embodiment shown in FIG. 1C, pressure wave 116 propagates in a direction that may be substantially opposite to the typical direction of flow F (see FIG. 1A). Portions of generated pressure wave 116 located away from the longitudinal center of vessel 102 may include a shearing vector component as well as a component that is substantially opposite the flow direction F. Where transducer 110 may be disposed at a location other than along the longitudinal center of vessel 102, it will be apparent that the force vectors applied by pressure waves 116 will differ. For example, that portion of the pressure wave that is aligned with the point of origination (for example, transducer 110) of pressure wave 116 may propagate in a direction that is substantially opposite the flow direction F.

While the generation of pressure wave 116 may result in at least some back flow of liquid as a result of the action of pressure wave 116 upon the liquid within vessel 102, dislodgment of residue 112 may be achieved largely as a result of the action of pressure wave 116 upon residue 112 rather than any backflow of the liquid that may momentarily occur.

Figure 1D:
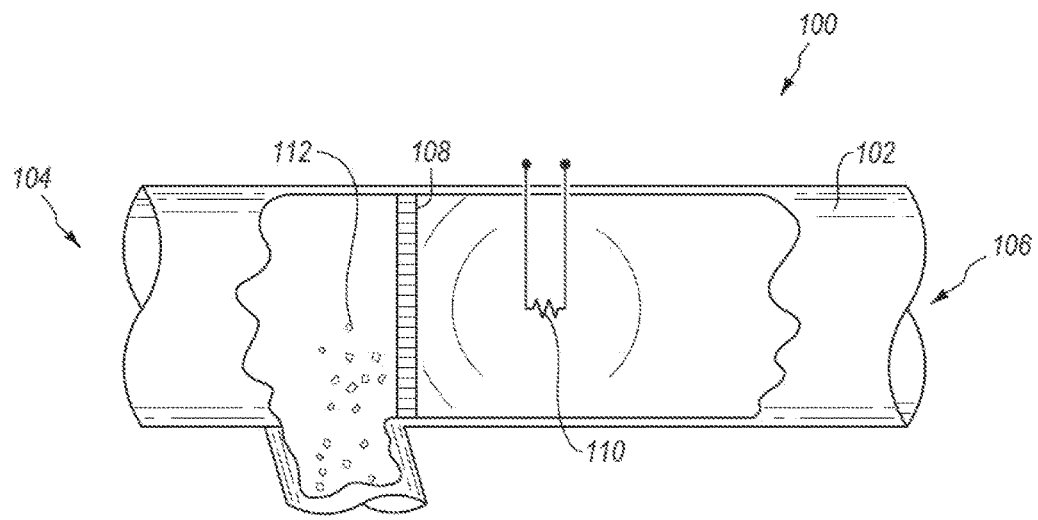
FIG. 1D is a cut-away perspective view of the filtration system of FIG. 1C illustrating removal of dislodged residue material through a bypass valve adjacent to the upstream side of the filter.

FIG. 1D shows how once residue 112 is dislodged from filter 108, they may be removed from vessel 102. It will be readily appreciated that pressure wave 116 is not required to dislodge all of residue 112, and that some portion of residue 112 may remain caked on filter 108 after the dislodgement by pressure wave 116. Whatever the fraction or portion of residue 112 dislodged, these materials may be removed to prevent their redeposition onto filter 108. While any removal mechanism may be employed, FIG. 1D illustrates opening of a bypass valve at a location adjacent to and upstream from filter 108, so that dislodged residue 112 may be removed after being dislodged. Any suitable mechanism for physical removal of residue 112 may be employed, the bypass valve of FIG. 1D merely represents a non-limiting embodiment of such a mechanism. Other mechanisms will be apparent to one of skill in the art in light of the present disclosure.

Figure 2A:
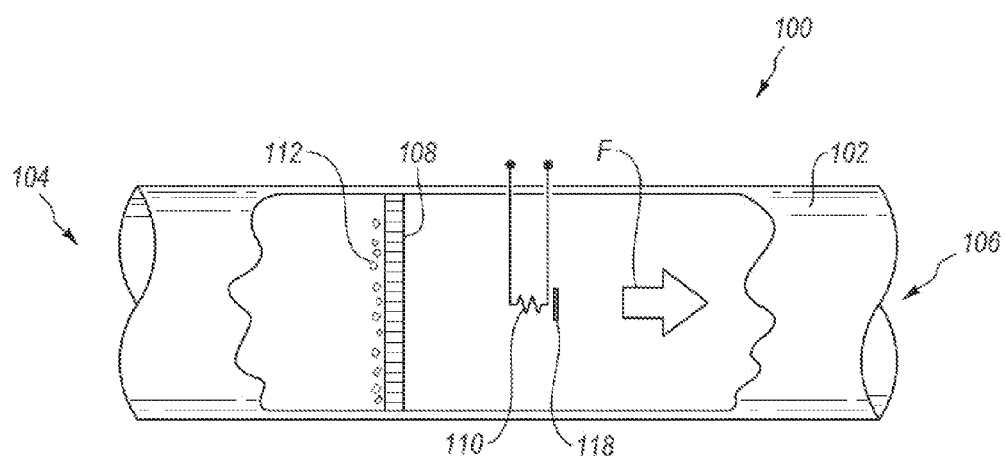
FIG. 2A is a cut-away perspective view of another embodiment of a filtration system similar to that of FIG. 1A, but including a pressure wave reflector configured to reflect a portion of a generated pressure wave that propagates away from the filter back towards the filter.
Figure 2B:
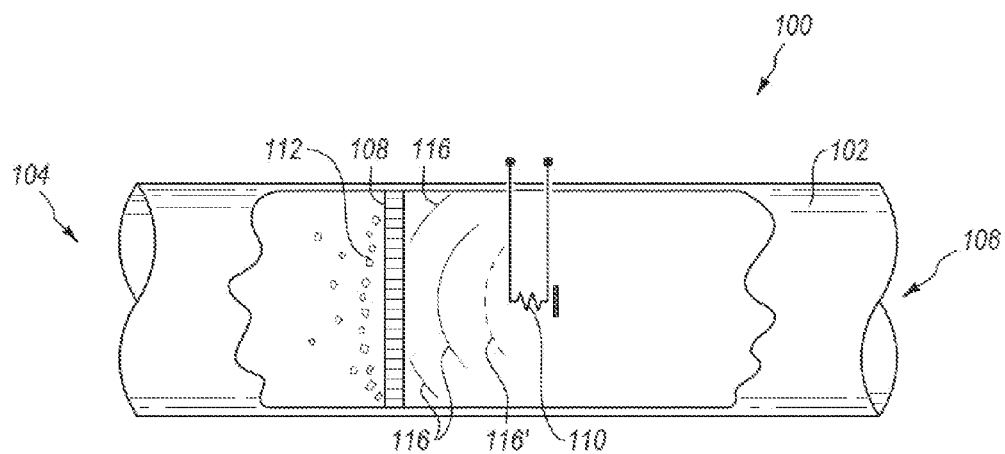
FIG. 2B is a cut-away perspective view of the filtration system of FIG. 2A illustrating reflection of a portion of the generated pressure wave.

As shown in FIGS. 2A and 2B, in order to increase the efficacy of generated pressure wave 116, system 100 may further include pressure wave reflector 118 configured to reflect a portion 116' of pressure wave 116 that propagates away from the upstream side of filter 108. For example, reflector 118 may be disposed downstream relative to transducer 110, so as to redirect that portion of pressure wave 116 that would otherwise be wasted. Reflector 118 may comprise any suitable rigid material (for example, rigid plastic, ceramic, metal, etc.). Reflection of portion 116' of pressure wave 116 back towards filter 108 increases the fraction of generated pressure wave 116 that is directed in a manner calculated to dislodge residue 112 caked or otherwise disposed on filter 108.

Figure 3:
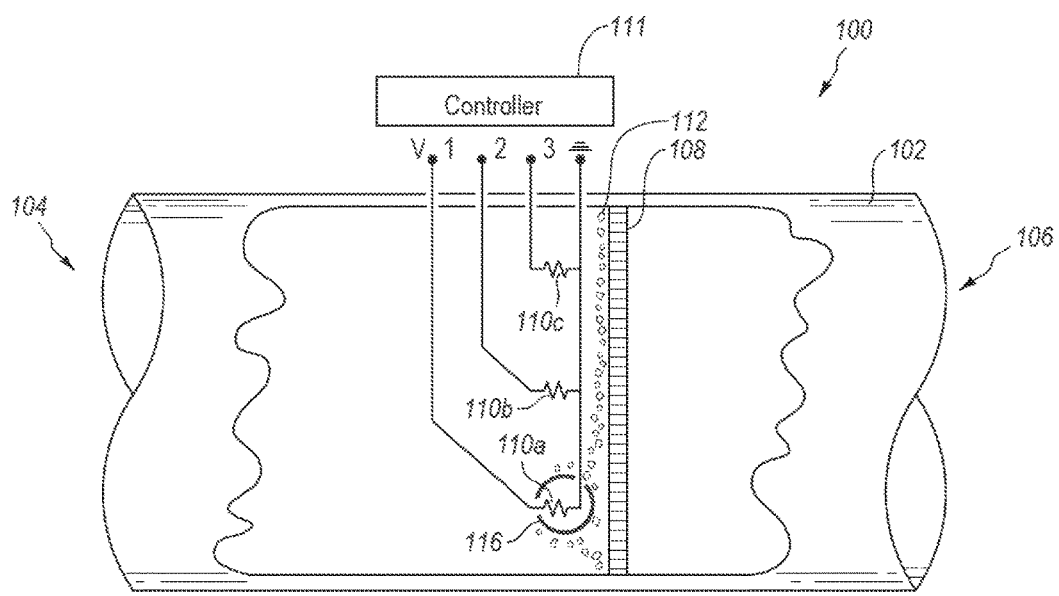
FIG. 3 is a cut-away perspective view of another embodiment of a filtration system similar to that of FIG. 1A, but including a plurality of transducers disposed adjacent to an upstream side of the filter.

FIG. 3 illustrates an embodiment of another filtration system 100 in which transducers 110 are disposed on an upstream side of filter 108, adjacent to where residue 112 becomes disposed onto filter 108. In an embodiment, the one or more transducers 110 may actually be disposed on or in filter 108 itself. FIGS. 4A and 4B illustrate such an embodiment. It will be readily apparent that placement of one or more transducers 110 may thus vary (for example, upstream from filter, downstream from filter, on filter, etc.), as desired. In some embodiments, placement will be relatively near filter 108 and residue 112 so that a generated pressure wave may be required to propagate only a relatively short distance, which limits dissipation and weakening of the force provided within the pressure wave for dislodging such residue 112. In an embodiment, transducers 110 may be disposed not more than about 10 cm, not more than about 5 cm, not more than about 3 cm, or not more than about 1 cm from the upstream side of filter 108 where residue 112 accumulate. All else being equal, closer placement increases the efficacy of the pressure wave 116 in dislodging residue 112.

As shown in FIG. 3, where transducers 110a-110c are disposed upstream relative to filter 108 and residue 112, the transducers may be located in very close proximity relative to residue 112 (for example, not more than about 10 mm, not more than about 5 mm, or not more than about 3 mm) Such close placement provides relatively greater strength to the dislodging force delivered to residue 112 by the generated pressure wave. Such relatively close placement also orients the generated pressure wave so that a larger fraction of the wave exhibits a force vector that is configured to shear the residue 112 from the surface of filter 108, rather than pushing residue 112 further into filter 108. In other words, closer placement of transducers 110a-110c results in a smaller radius exhibited by the pressure wave at the time it first contacts residue 112. Thus, only a small fraction of the pressure wave is oriented to push residue 112 further into filter 108, while the vast majority of the circumference of the pressure wave is oriented to shear solids 112 from filter 108. Furthermore, the applied shearing force is concentrated within a relatively smaller radius circle, so that the shearing force applied to any given location along residue 112 is correspondingly higher than if the pressure wave exhibited a relatively larger radius (which corresponds to further placement from filter 108 and residue 112).

Relatively close placement of the transducers to filter 108 may be particularly beneficial where the transducers are disposed upstream relative to filter 108. When positioned downstream as in FIG. 1A-1D, no portion of the pressure wave may exhibit a force vector that pushes residue 112 further into filter 108. Thus relatively close placement to filter 108 may be particularly beneficial where the transducers are placed upstream relative to filter 108. In some embodiments, transducers may be placed both upstream and downstream (or on the filter and downstream, or on the filter and upstream).

FIG. 3 further illustrates how one of 3 illustrated transducers 110a-110c fires, generating a vapor bubble and associated pressure wave 116. Pressure wave 116 shears at least some residue 112 from filter 108 adjacent to transducer 110c. Additional transducers 110b and 110a may fire relative to transducer 110c in any desired sequence. In an embodiment, all transducers may fire substantially simultaneously. In another embodiment, all transducers may fire in a non-simultaneous sequence, for example, that may be configured to more effectively or efficiently dislodge residue 112. In an embodiment, transducer 110c may fire, followed by firing of transducer 110b, followed by firing of transducer 110a. Any of transducers 110a-110c may fire again, even in a different sequence. For example, transducer 110c may fire, followed by 110b, followed by 110a, followed by simultaneous firing of all of transducers 110a-110c. It will be readily apparent that any conceivable firing sequence, including any number of transducers, arranged in any desired geometric pattern, may be employed, as desired. A controller 111 may be provided to provide electrical power to transducers 110a-110c (for example, through electrically conductive traces or other wiring) in a desired sequence.

FIGS. 4A and 4B illustrate an embodiment of a filter 208 including a plurality of transducers 210 disposed on filter 208, and in which filter 208 further includes one or more electrically conductive traces 218 disposed on filter 208 configured to provide electrical power to transducers 210. Thus, during use, transducers 210 may be selectively activated so as to result in generation of a pressure wave that dislodges at least some residue 212 caked or otherwise disposed on an upstream side of filter 208. As perhaps best seen in FIG. 4B, transducers 210 may be disposed on only one side of filter 208 (for example, that side of filter 208 which becomes the upstream side of filter 208 during use). Traces 218 may be flexible, as the substrate 220 of filter 208 may also be flexible, allowing such a filter to be employed in helically wound or other layered filtration systems.

Filter 208 may comprise a flexible, polymeric mesh membrane substrate 220, for example, such as those typically employed for reverse osmosis separation or other filtration techniques. Suitable polymeric materials from which filter substrate 220 may be formed include, but are not limited to cellulose acetate, polysulfone, polyamide, polyolefins, and combinations thereof. Other materials (for example, paper, natural or synthetic fibers, metallic fiber or web, etc.) may also be employed. It will be readily apparent that any suitable substrate material capable of filtering undesirable residue materials from a liquid may be employed. Substrate 220 may advantageously exhibit thermal stability so as to resist degradation that might otherwise occur upon exposure to heating, or repeated exposure vaporized liquid (for example, steam) within the liquid feed. Substrate 220 may also advantageously be bondable to electrically conductive traces 218 so as to prevent separation of traces 218 from substrate 220. Furthermore, traces 218, transducers 210, and or other components may be coated with a protective coating (for example, a silicone or similar protective polymer coating) to protect and/or insulate such components.

Where transducers 210 comprise resistive heating elements that operate to vaporize a portion of the liquid to form a vapor bubble (which results in generation of a pressure wave as a result of the nearly instantaneous increase in volume), transducers 210 may include an electrically insulative layer 222 disposed over a portion of transducer 210 to reduce a surface area of heating element transducer 210 exposed to the liquid to be vaporized. Such a reduction in surface area serves to decrease the power required to be delivered to vaporize the liquid in contact with heating element transducer 210. Such an insulative layer 222 may comprise any suitable electrically insulative material (for example, plastic, ceramic, etc.). Layer 222 may also exhibit thermal insulative characteristics to aid in focusing delivery of the generated heat to a desired area.

In an embodiment, insulative layer 222 may comprise a substantially rigid material (for example, a rigid plastic or ceramic) that also serves as a pressure wave reflector to reflect that portion of a generated pressure wave that propagates away from a fouling layer residue back towards the upstream side of the filter so as to direct more of the energy of the generated pressure wave so that it results in dislodgement of residue materials caked onto or otherwise disposed on filter 208. In another embodiment, a separate rigid pressure wave reflector may be provided (for example, similar to reflector 118 of FIG. 2A).

In an embodiment, electrically conductive traces 218 and transducers 210 cover only a relatively small fraction of the face of filter 208 on which they are disposed. For example, traces 218 and transducers 210 may be disposed on the upstream face of filter 208, and may cover or occlude no more than about 10% of the surface area of the face on which they are disposed, no more than about 5% of the face on which they are disposed, or no more than about 3% of the face on which they are disposed. Such small fractions prevent the inclusion of traces 218 and transducers 210 from interfering significantly with efficacy of filter 208.

In some embodiments, it may be possible to position traces 218 and transducers 210 on the downstream side of the filter, and the generated pressure wave may include at least a portion thereof that propagates upstream, through the filter so as to dislodge residue materials disposed on the upstream face. In another embodiment, it may be possible to position transducers 210 on an upstream face of filter 208, while positioning traces 218 on the downstream face of filter 208, with a portion of trace(s) 218 passing through substrate 220 to make the needed electrical connection with transducer 210. In another embodiment, traces 218 may be embedded within substrate 220. While the electrical connections are described as being formed with the use of electrically conductive traces, it will be understood that any other electrical connection (for example, one or more wires) may also be employed. For purposes of the present disclosure and claims, the term "electrically conductive trace" is to be broadly construed to include wires or similar electrical connections.

Filtration systems including one or more transducers for generating a pressure wave may be employed within any suitable filtration configuration. FIGS. 1A-1D show filter 108 configured as a dead end filter that extends across vessel 102 (for example, a pipe) in an orientation that is substantially perpendicular to the direction of flow F. In addition to such a dead end configuration, other configurations, such as, but not limited to, cross-flow filters, helically wound filters, and hollow filters (for example, a hollow fiber filtration system) are also contemplated. Other configurations may also be employed.

Figure 5:
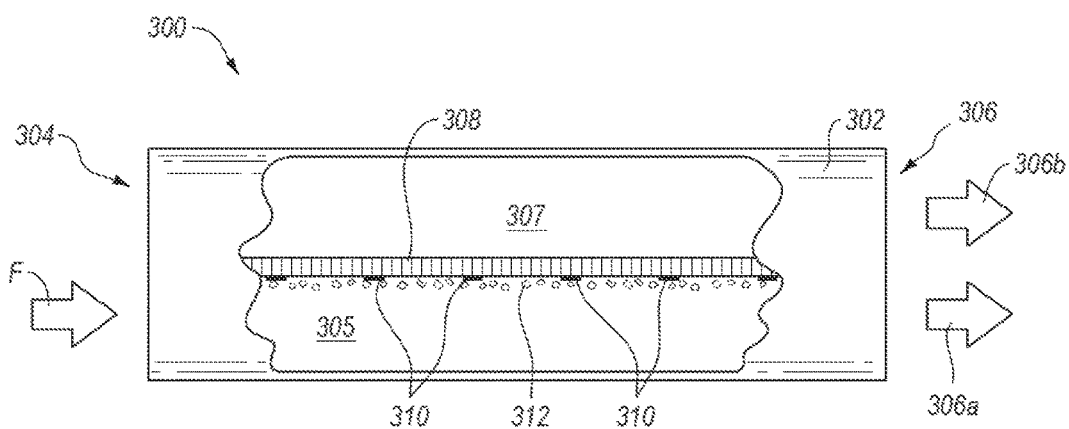
FIG. 5 is a schematic view of a filtration system that provides a cross-flow configuration.

FIG. 5 illustrates an embodiment of a filtration system 300 having a cross-flow configuration in which the direction of flow F is substantially parallel to filter 308 during operation. For example, a feed liquid may be introduced through inlet 304 into portion 305 of vessel 302. Pressure may be applied to grey liquid within portion 305 so as to cause a portion of the liquid to flow through filter 308, into portion 307, while residue 312 within the liquid are collected against filter 308.

Concentrated grey liquid 306a may exit from system 300 through outlet 306, while filtered cleaned liquid (for example, clean water) 306b may exit through a separate outlet at outlet 306. For purposes of such a cross-flow filter, portion 305 may be considered to be on a "upstream" side of filter 308, as liquid within this portion has not yet passed through filter 308. Similarly, portion 307 may be considered to be on a "downstream" side of filter 308, as liquid within this portion has passed through filter 308. Residue 312 collects on the upstream side of filter 308, within portion 305.

Filter 308 may include one or more transducers 310 disposed thereon (for example, as shown in FIGS. 4A and 4B) so as to generate one or more pressure waves to dislodge at least some of residue 312. In another embodiment, one or more transducers 310 may be disposed adjacent to filter 308, for example, within portion 307, downstream from filter 308 similar to the configuration shown in FIG. 1A, or upstream from filter 308, within portion 305, similar to the configuration shown in FIG. 3. In any case, transducers 310 are disposed so as to generate one or more pressure waves effective to dislodge residue 312. It will thus be appreciated that any suitable disposition of transducers (for example, disposed in, on, or adjacent to filter 308) may be possible.

Figure 6A:
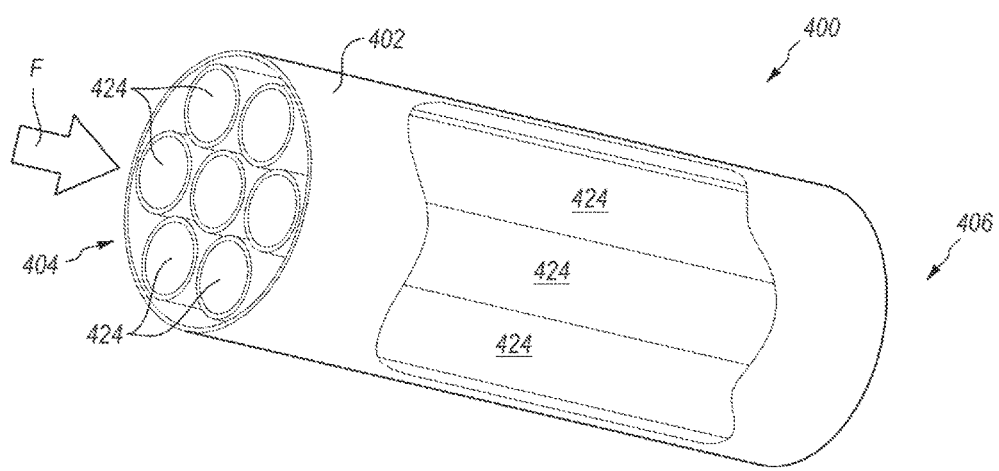
FIG. 6A is a schematic perspective view of a filtration system configured as a plurality of hollow filters.
Figure 6B:
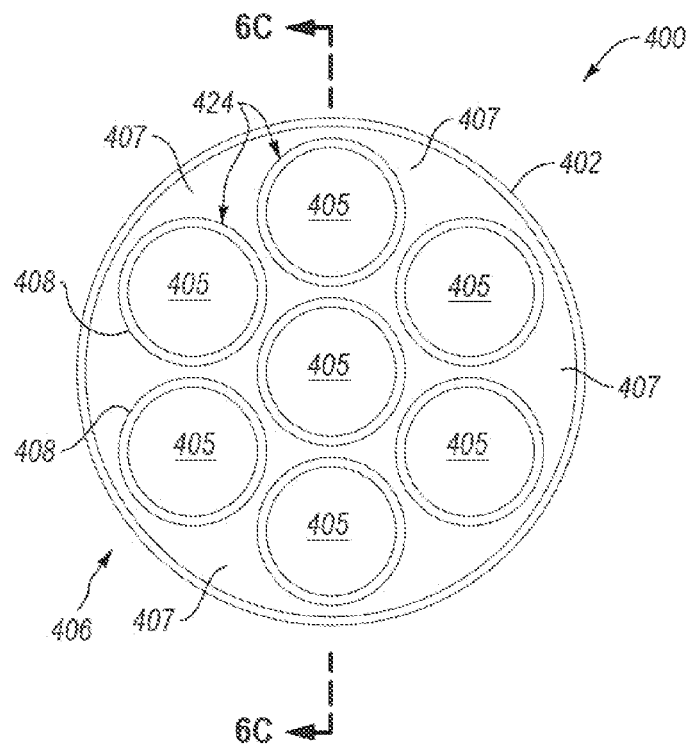
FIG. 6B is an end view of the outlet of the filtration system of FIG. 6A.
Figure 6C:
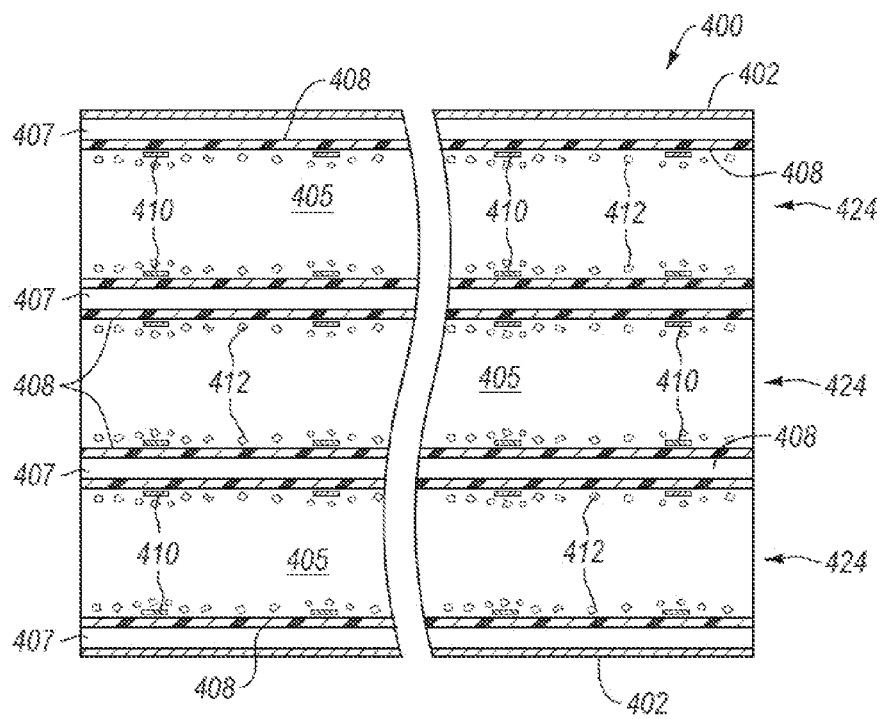
FIG. 6C is a longitudinal cross-sectional view through the filtration system of FIG. 6B.

FIGS. 6A-6C illustrate an embodiment of a filtration system 400 configured as a hollow (for example, a tube) filter, which specifically has a configuration including a plurality of hollow filters 424 that may be disposed within a vessel (for example, a tube) 402. The cylindrical wall 408 of each hollow filter 424 may comprise a filter configured to filter residue 412 from a liquid feed F. Liquid feed F may be introduced into filtration system 400 through inlet 404 so that the liquid is fed into hollow filters 424. Hollow filters 424 may operate as parallel filtration systems, increasing the filtration capacity of the system as compared to a single hollow filter. In other words, any given portion of the liquid to be filtered may pass through only one of hollow filters 424. As the liquid advances towards outlet 406, the filtered, clean liquid migrates across filter wall 408 to the region 407 that is exterior to hollow filters 424, but within collection vessel 402. Thus, the filtered liquid (for example, clean water) can be collected at outlet 406 from region 407, surrounding hollow filters 424. Concentrated "dirty" grey liquid may exit system 400 through the outlet ends 406 of hollow filters 424. The two exiting flows are separated from one another. In an embodiment, hollow filters 424 may comprise hollow fiber membrane filters (for example, to form a hollow fiber filtration system). The hollow fiber membrane filters may be in the form of microfilters or nanofilters.

Similar to the filter illustrated in FIG. 5, such a configuration (for example, tube-in-tube) may operate in a cross-flow configuration, where the interior 405 of hollow filters 424 may be considered to be on an "upstream" side of filter 408, as liquid within hollow filters 424 has not passed through filter 408. Portion 407 that is exterior hollow filters 424 and within outer vessel 402 may be considered to be a downstream side of filter 408, as liquid within this portion has passed through filter 408. While described in the context of the grey liquid being fed into hollow filters 424 at inlet 404, it will be understood that the opposite configuration may be employed, where grey liquid is fed into region 407, exterior hollow filters 424, so that the relationships are reversed. In other words, filtered clean liquid would then exit from the outlet ends of hollow filters 424, while the concentrated "dirty" grey liquid would remain within portion 407, exterior hollow filters 424.

The cylindrical wall 408 of each hollow filter 424 may itself comprise the filter. As shown in FIG. 6C, the flow of liquid through hollow filters 424 results in residue filtered from the liquid collecting on the inside or upstream surface of filter wall 408, as filtered clean liquid (for example, clean water) passes through the filter wall 408 into region 407. One or more of filter walls 408 may include one or more transducers 410 disposed thereon or therein so as to generate one or more pressure waves to dislodge residue fouling layer 412. In another embodiment, one or more transducers 410 may be disposed adjacent to (but perhaps not on or in) filter wall 408 so as to generate one or more pressure waves effective to dislodge at least some of residue 412. It will thus be appreciated that any suitable placement of transducers 410 (for example, disposed on or adjacent to filter 408) may be possible.

While the systems illustrated in FIGS. 5 and 6A-6C have been described in terms of a cross-flow system, it will be understood that such systems could also be configured to operate as a direct flow system.

Figure 6D:
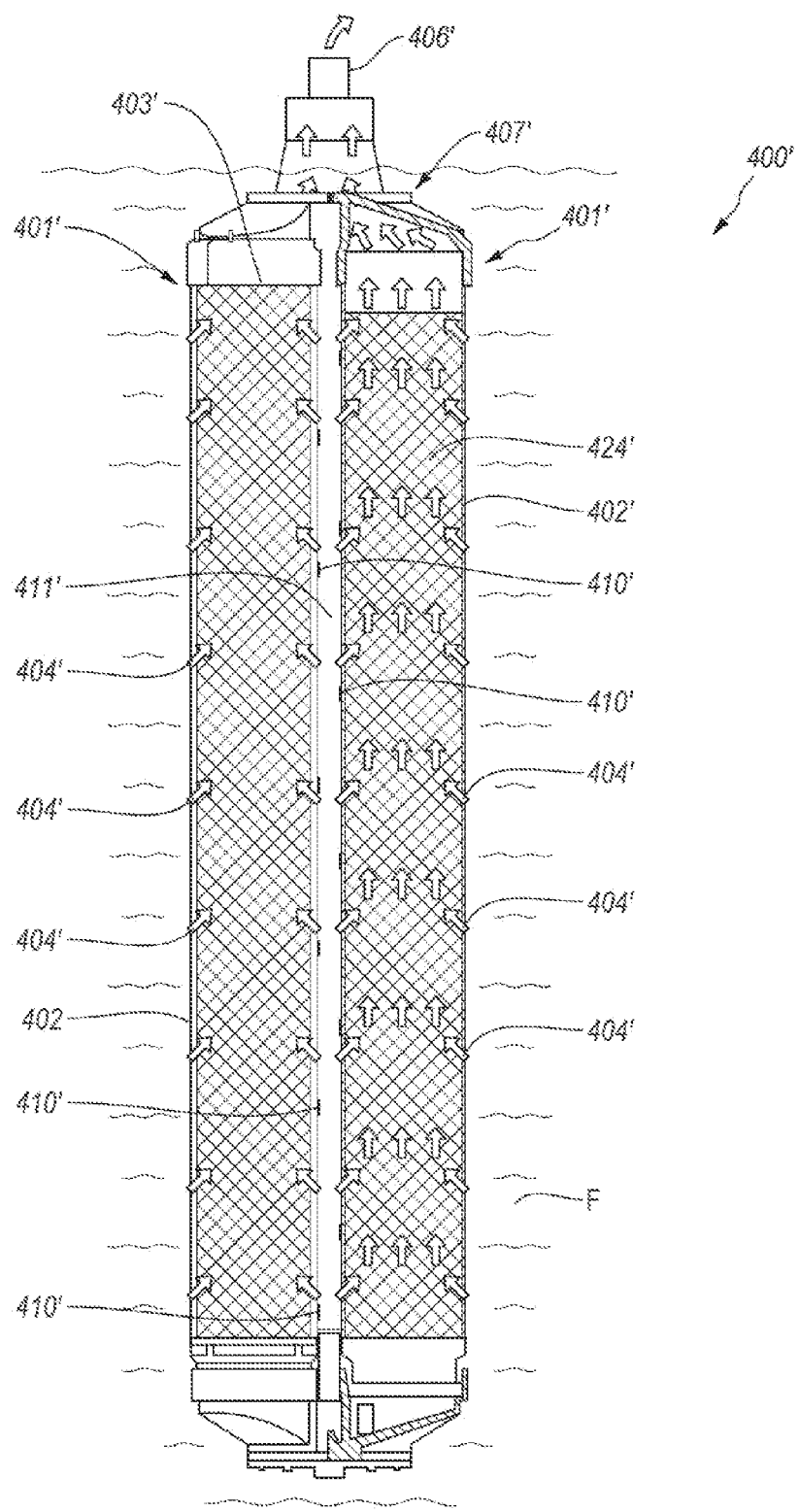
FIG. 6D is a longitudinal partial cross-sectional view through another embodiment of a filtration system configured with a plurality of hollow fiber membrane filters.
Figure 6E:
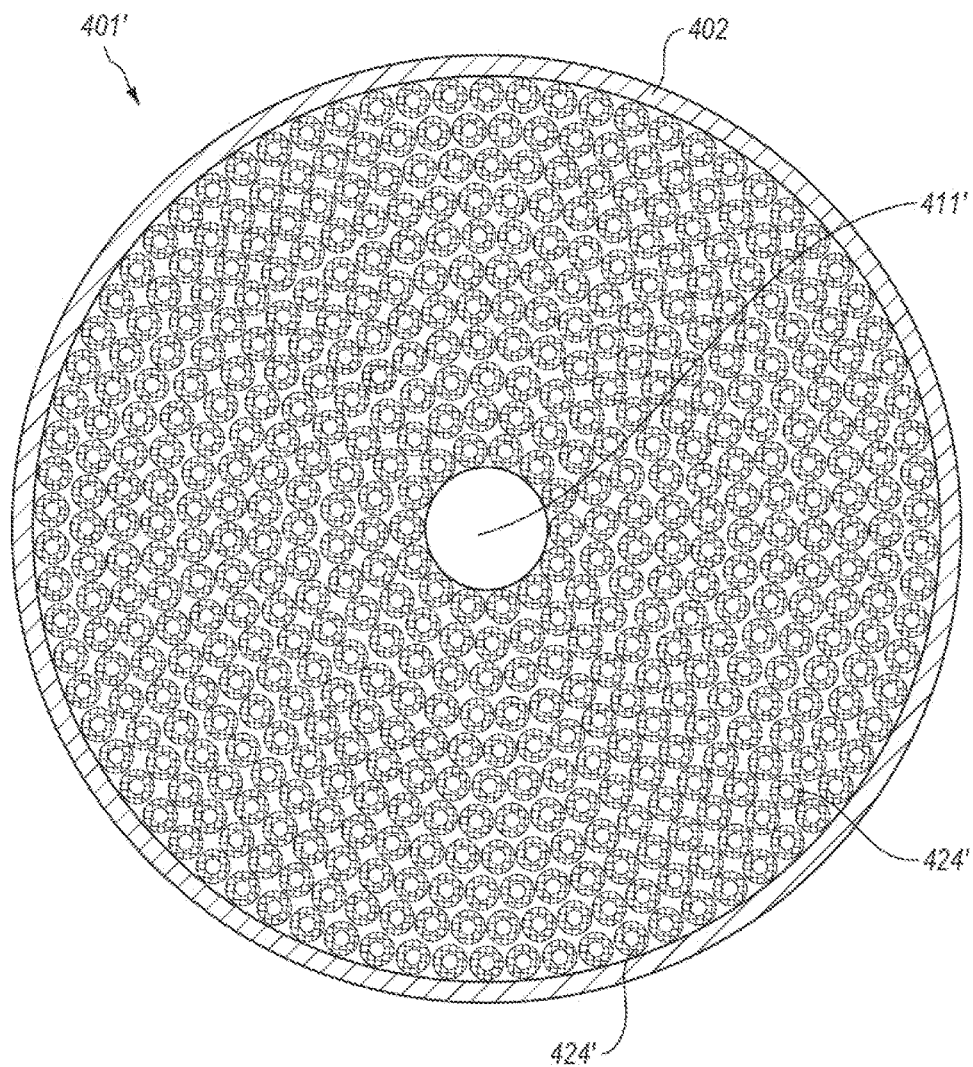
FIG. 6E is a transverse cross-sectional view through the filtration system of FIG. 6D.
Figure 6F:
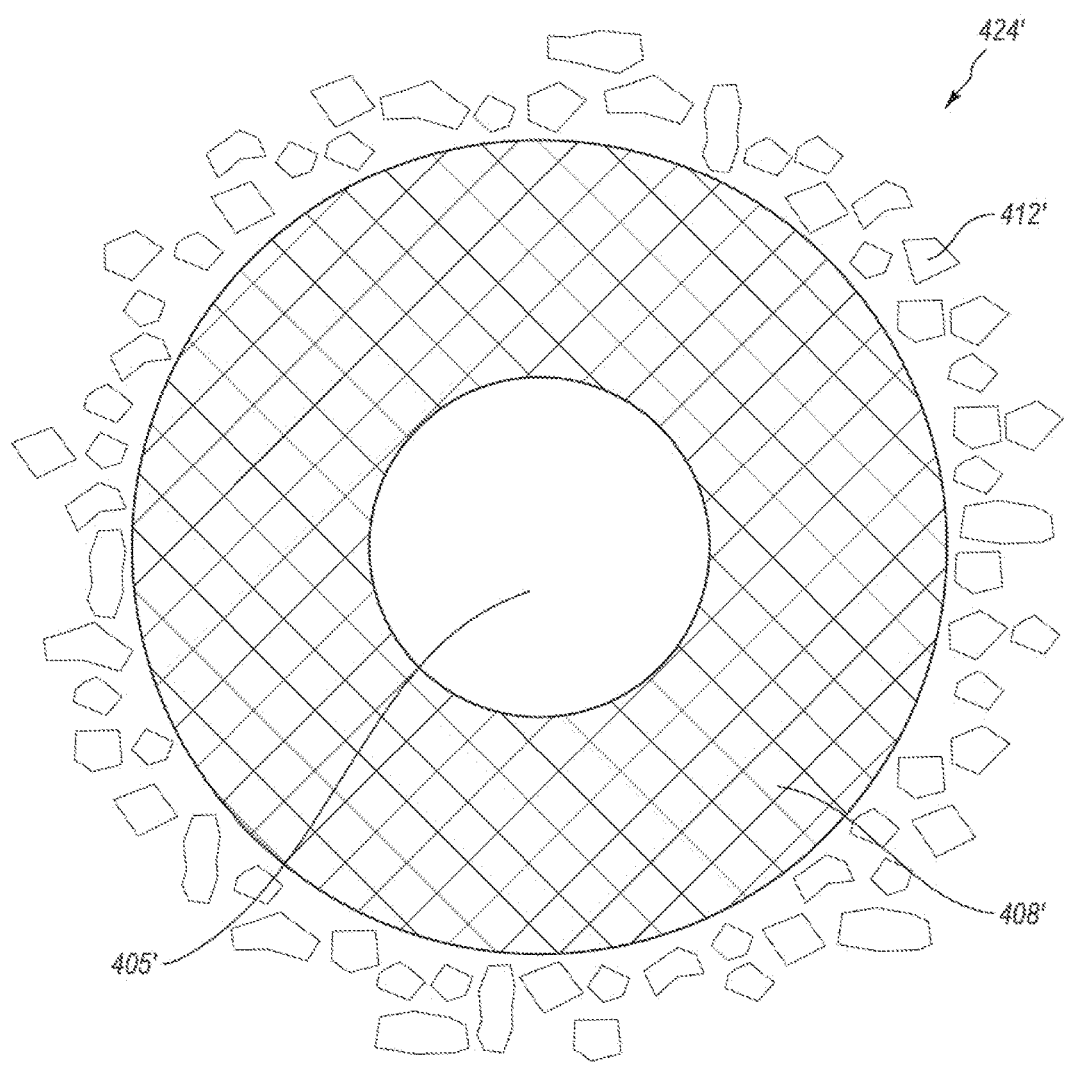
FIG. 6F is a transverse cross-sectional view through a single hollow fiber membrane filter such as that included in the filtration system of FIG. 6D.

Another embodiment of a hollow fiber filtration system is shown in FIGS. 6D-6F. Filtration system 400' includes a bundle of hollow fiber membrane filters 424' oriented so as to extend longitudinally within system 400'. Bundles of hollow fiber membrane filters 424' may be provided in a plurality of filter modules 401' (for example, system 400' may include 4 modules 401'). Each module includes a plurality of hollow fiber membrane filters 424', so that individual modules 401' may be removed and replaced, as needed. System 400' may include a header 403', in which the hollow fiber membrane filters 424' are mounted in header 403' in close proximity to one another to prevent excessive movement therebetween, for example, as seen in FIGS. 6D-6E. Filtrate from the plurality of modules 401' may be collected through a common manifold 407' for delivery to outlet 406'. The plurality of hollow fiber membrane filters 424' may be contained within a protective perforated cage (for example, screen mesh) 402'. The wall 408' of each fiber membrane filter may comprise a filter configured to filter residual materials 412' from a liquid feed, which enters any given fiber membrane filter 424' through wall 408'. Liquid to be filtered is conveyed from the outside of each hollow fiber membrane filter 424', through wall 408', leaving fouling layer residue 412' surrounding the outside of each fiber membrane filter 424' (see FIG. 6F). The liquid filtrate (for example, cleaned liquid) passes up the hollow central lumen 405' of each fiber membrane filter 424' where it is then conveyed into a collection manifold 407' and outlet 406'. Hollow fiber filtration system 400' may be submerged in the liquid F (for example, grey water) to be filtered. The system may be configured to draw liquid F inwardly along a length of fiber membrane filters 424', which serve as inlets 404' through wall 408'. Drawing of liquid F may be achieved in a system at atmospheric pressure through placement of a pump on a downstream side of system 400'. Alternatively, liquid F may be pressurized for force flow into walls 408' of fiber membrane filters 424'.

Filtration system 400' includes one or more transducers for generating pressure wave(s) configured to dislodge residue fouling layer 412'. For example, transducers 410' may be disposed within central cavity 411'. In another embodiment, transducers 410' may be disposed on or within fiber walls 408' (for example, on the exterior surface, where fouling layer 412' forms) so as to generate one or more pressure waves to dislodge residue fouling layer 412'. In another embodiment, one or more transducers may be disposed adjacent to (but perhaps not on or in) filter wall 408' so as to generate one or more pressure waves effective to dislodge at least some of residue 412'. In one embodiment, transducer(s) 410' may be disposed longitudinally among the plurality of hollow fiber membrane filters 424'. In another embodiment, transducer(s) 410' may be disposed axially within module 401'. It will thus be appreciated that any suitable placement of transducers (for example, disposed on or adjacent to wall 408') may be possible.

While described in a configuration where flow is from outside of hollow fiber membrane filters 424', through wall 408' and into lumen 405', it will be understood that a configuration having an opposite flow direction is also possible. Such an embodiment may lead to build up of fouling layer residue 412' on the inside surface of lumen 405'. In such an embodiment, transducers 410' may be disposed on an inside surface of lumen 405', where fouling layer residue 412' collects, within cavity 411', or anywhere else that will result in the desired dislodgement of at least some of residue 412'.

Figure 7:
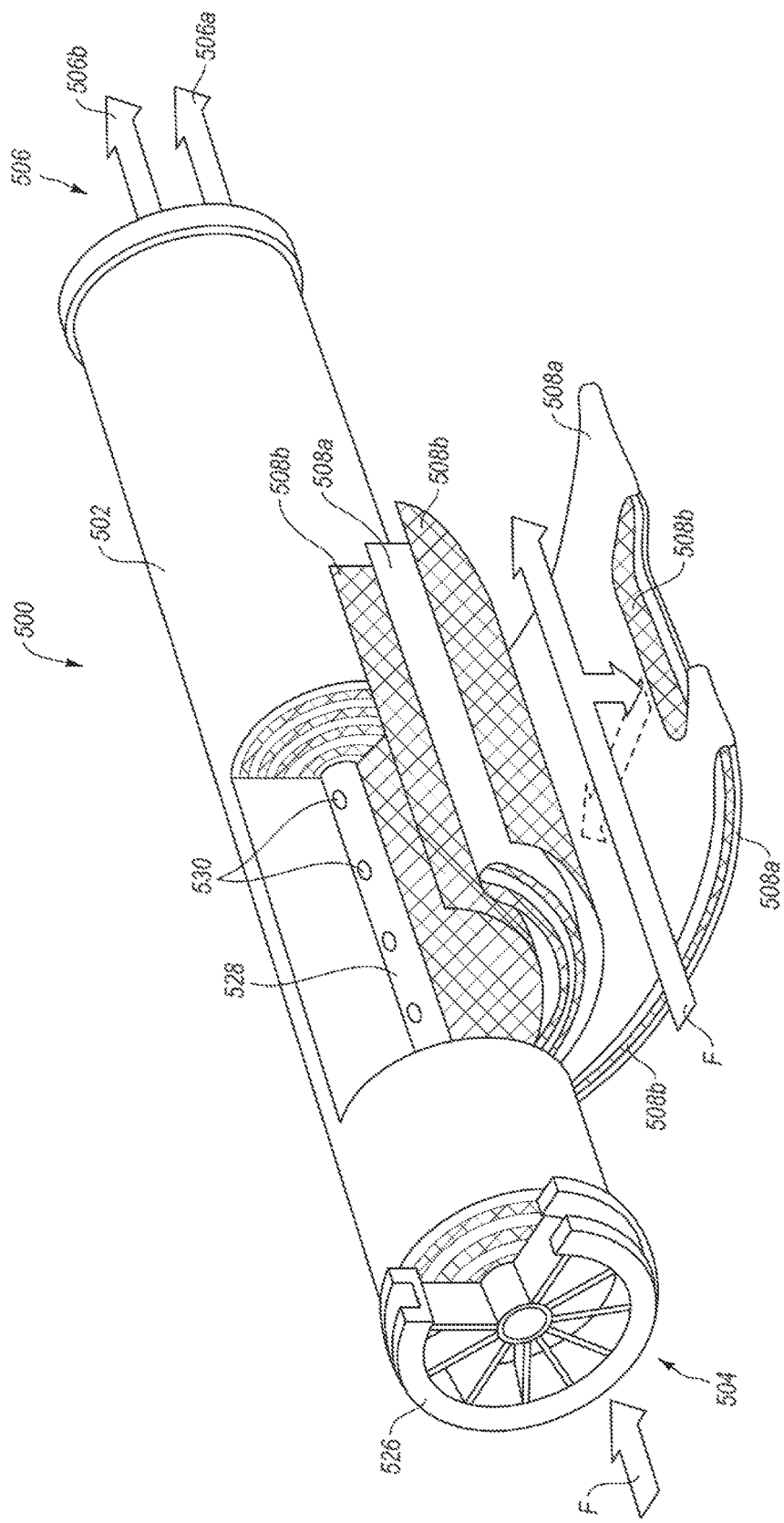
FIG. 7 is a perspective and partial cut away view of a helically wound filtration system.

FIG. 7 illustrates a filtration system 500 configured as a helically wound filtration system. Such a helically wound configuration may include a plurality of filter membrane layers 508a separated by a plurality of spacer layers 508b. Thus, filter layers 508a may be sandwiched between adjacent spacer layers 508b, while spacer layers 508b are similarly sandwiched between adjacent filter layers 508a. The sandwiched, alternating layer structure may be helically or spirally wound for placement within a cylindrical housing 502.

Liquid feed F is fed through inlet 504, while grey liquid concentrate 506a and filtered clean liquid 506b exit separately through outlet 506. Pressurized grey liquid feed F may be introduced through a seal 526 at inlet 504. Feed F enters between layers 508a and 508b, and the clean portion of the liquid (for example, pure water) passes through filter layer 508a, where it may proceed to product collection vessel 528 that may be disposed at the center of helically wound filtration system 500. Vessel 528 may include perforations 530 through which the filtered clean liquid is allowed to enter for conveyance towards outlet 506. Filtered clean liquid 506b exits through the outlet 506 of vessel 528. Concentrated "dirty" liquid that does not penetrate through filter layer 508a is conveyed towards outlet 506, exiting separately as concentrated liquid at 506a.

Similar to several of the previously described configurations, a surface of filter layers 508a that is adjacent to feed F may be considered to be on an "upstream" side of filter layer 508a. An opposite surface of filter layer 508a that is adjacent to where filtered clean liquid exits from the filter layer 508a may be considered to be a downstream side of filter layer 508a.

One or more of filter layers 508a may include one or more transducers (not shown so as to not overly complicate FIG. 7) disposed thereon or therein so as to generate one or more pressure waves to dislodge filter residue materials stopped by the upstream side of filter layers 508a. In another embodiment, one or more transducers may be disposed adjacent to (but perhaps not on or in) the filter layers 508a so as to generate one or more pressure waves effective to dislodge a fouling layer residue disposed on filter layers 508a. It will thus be appreciated that any suitable placement of transducers (for example, disposed on or adjacent to filter layers 508a) may be possible.

Figure 8:
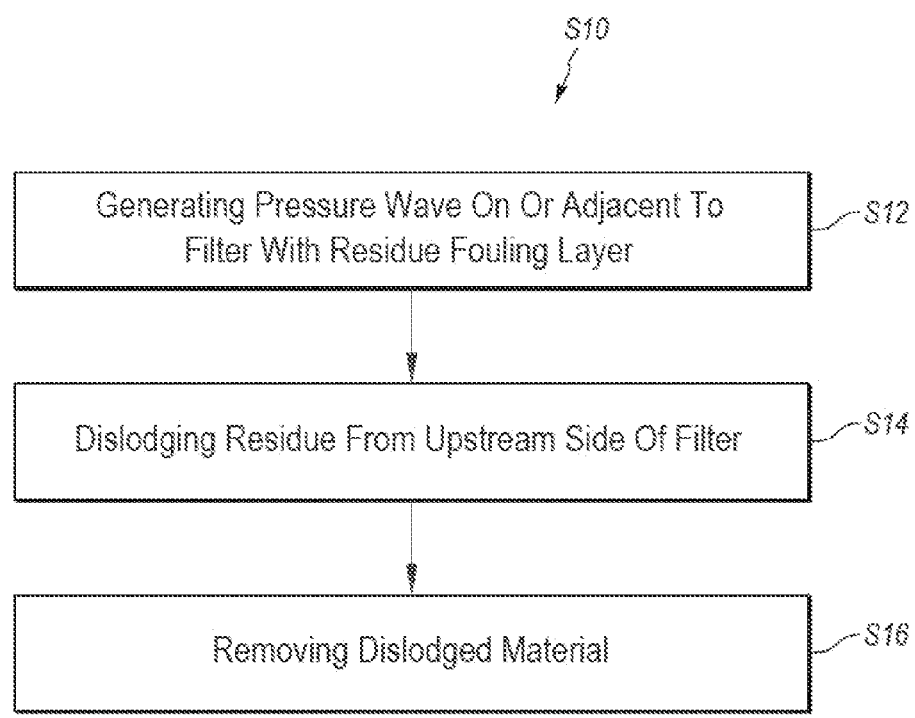
FIG. 8 is a flowchart describing an illustrative embodiment of a method of removing at least some residue from a filter used to filter a liquid.

FIG. 8 describes a method S10 by which a filter residue may be removed from a filter used in filtering a liquid. As shown, at S12, a pressure wave may be generated on or adjacent to a filter having filtered residue adhered thereto. Such a pressure wave may be generated by a transducer disposed on, in or adjacent to the filter. The transducer may employ an electrical power or other power input, and output energy in another form that directly or indirectly results in generation of a pressure wave. The one or more transducers may apply electrical resistance heating to the liquid so as to result in vaporization of a portion of the liquid adjacent to the transducer. Where heating is employed, the method may further include reducing the flow into the filter prior to activation of the transducer so as to reduce the power required to achieve liquid vaporization.

Another embodiment of a transducer may comprise a high frequency ultrasonic generator that similarly results in generation of vapor bubbles within the liquid. In either case, the generated vapor bubble results in the generation of a pressure wave as a result of the near instantaneous expansion of the liquid as it undergoes a phase change from a liquid to a gas. In another embodiment, the transducer may activate a laser (for example, a laser diode) that results in heating of liquid adjacent to the laser, which causes the liquid to undergo a phase change from a liquid to a gas, resulting in generation of a pressure wave due to the near instantaneous expansion associated with the phase change. Another transducer that similarly results in heating and vaporization may include a spark gap. Various other transducers may also be suitable for use.

Because of the generation of the pressure wave, at S14 residue materials that are caked on an upstream side of the filter are dislodged from the filter, as a result of the action of the pressure wave against the residue materials. The pressure wave may advantageously be generated in a manner so that at least a portion of the force vector applied by the pressure wave is configured to shear or otherwise dislodge filter residue materials from the filter surface, rather than press the filter residue materials further into the filter. Once the filter residue material is dislodged from the filter, the dislodged materials may be removed at S16 (for example, through a bypass valve or other suitable removal mechanism).

It will be appreciated that such a method may operate as a continuous or batch process. Furthermore, in any case, the method may involve continuous or periodic activation of the one or more transducers so as to dislodge the filter residue materials collected on an upstream side of the filter. For example, in one embodiment the transducers may be activated at desired intervals, while a bypass valve may be activated to remove dislodged filter residue materials at the same or a different interval. Thus, the pressure wave(s) may be generated substantially continuously or periodically. Similarly, the dislodged filter residue materials may be removed from the system substantially continuously or periodically.

It will be appreciated that the present methods do not necessarily require a "back-flush" operation that would require flow reversal through the filter. Similarly, the present methods do not necessarily require introduction of a mixed liquid/gas stream into the system to scour or "airlift" the filter fouling layer residue from the filter. Furthermore, where a vapor is generated within the filtration system adjacent to the filter or filter residue, this vapor may simply represent the liquid (for example, water) of the feed vaporized from liquid to a vapor state (for example, still water), and thus may not typically involve the introduction or generation of dangerous gases (for example, $H_2$ or $O_2$) within the system. This is not to be understood that the present methods cannot employ features such as "backflushing", "airlifting" or generation of dangerous gases, but that such features are not required, and if they are included, are entirely optional.

One skilled in the art will appreciate that, for this and other processes and methods disclosed herein, the functions performed in the processes and methods may be implemented in differing order, in at least some embodiments. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to,", etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A filtration system for filtration of solids from a liquid, the filtration system comprising:
   a vessel that includes an inlet through which the liquid is introduced during use and an outlet through which filtered liquid exits;
   a filter disposable within the vessel between the inlet and the outlet, wherein the filter is configured to filter the liquid;
   at least one transducer disposed in, on, or adjacent to the filter, wherein the at least one transducer comprises a vapor bubble generating resistive heating element, a laser, or a sparking gap configured to generate one or more pressure waves effective to dislodge at least some residue from the filter.

2. The filtration system of claim 1, wherein the at least one transducer comprises at least one vapor bubble generating resistive heating element configured to generate at least one vapor bubble that displaces the liquid to create a pressure wave effective to dislodge the at least some residue from the filter.

3. The filtration system of claim 1, wherein the at least one transducer includes a plurality of transducers that are disposed on an upstream side of the filter, wherein the filter comprises a plurality of electrically conductive traces configured to provide electrical power to the plurality of transducers.

4. The filtration system of claim 3, wherein the plurality of electrically conductive traces and the plurality of transducers occlude no more than about 10% of a surface area of the upstream side of the filter.

5. The filtration system of claim 3, further comprising a controller configured to provide the electrical power to the plurality of electrically conductive traces in a selected sequence.

6. The filtration system of claim 1, further comprising a pressure wave reflector configured to reflect a portion of a generated pressure wave that propagates away from an upstream side of the filter back towards the upstream side of the filter.

7. The filtration system of claim 1, wherein the filtration system includes a dead end filter that extends across the vessel and have an orientation that is substantially perpendicular to a direction of flow from the inlet to the outlet.

8. The filtration system of claim 1, wherein the filtration system is configured as a cross-flow filtration system to maintain a direction of flow substantially parallel to the filter during use.

9. The filtration system of claim 1, wherein the filtration system is configured as a helically wound filtration system.

* * * * *